United States Patent [19]

Löwe

[11] 4,333,106
[45] Jun. 1, 1982

[54] METHOD OF MEASURING FIRING MISSES AND FIRING MISS-MEASURING INSTALLATION FOR THE PERFORMANCE OF THE METHOD

[75] Inventor: Günter Löwe, Weilerhohn, 5204 Lohmar 21, Fed. Rep. of Germany

[73] Assignee: Günter Löwe, Lohmar, Fed. Rep. of Germany

[21] Appl. No.: 142,169

[22] Filed: Apr. 21, 1980

[30] Foreign Application Priority Data

May 4, 1979 [CH] Switzerland .......................... 4181/79

[51] Int. Cl.³ .......................... H04N 7/18; F41G 3/08
[52] U.S. Cl. ..................................... 358/107; 358/109; 358/125; 89/41 TY
[58] Field of Search ............... 358/107, 106, 109, 125, 358/126; 89/41 TY, 41 L; 343/6 TY, 12 MD

[56] References Cited

U.S. PATENT DOCUMENTS

2,056,216 10/1936 Somers et al. .................. 89/41 TY
3,798,795 3/1974 Michelsen .......................... 358/125

Primary Examiner—Robert L. Richardson
Assistant Examiner—Edward L. Coles
Attorney, Agent, or Firm—Werner W. Kleeman

[57] ABSTRACT

A firing miss-measuring installation and method by means of which it is possible to directly measure firing misses, i.e. the distance between the projectile and the target. Live ammunition is used for firing at a target, such as a tow bag or other target simulating device. The firing miss-measuring installation contains two television cameras, azimuth and elevation coding devices, distance measuring devices, target tracking devices, analogue-digital converters and a process computer containing a program in order to compute the actual distance between the target and the projectile which appears at both image or monitoring screens of the television cameras.

1 Claim, 7 Drawing Figures

METHOD OF MEASURING FIRING MISSES AND FIRING MISS-MEASURING INSTALLATION FOR THE PERFORMANCE OF THE METHOD

BACKGROUND OF THE INVENTION

The present invention relates to a new and improved method of measuring firing misses during firing at a movable airborne target and for scoring the measured firing misses, wherein there are continuously measured elevation angle and azimuth angle as well as the distance to the target, the data of the measurement results being stored in a process computer.

The invention further pertains to a firing miss-measuring installation for performance of the method, which is of the type comprising a television camera for tracking the movable airborne target, azimuth and elevation coding devices for measuring the position of the visual target line, a distance measuring device for determining the distance between the target and the weapon, and a process computer which is connected with the coding or encoding devices and the distance measuring devices, in order to record or plot the position and distance of the target. There are already known to the art different methods and installations for measuring firing misses. Prior art references relevant to this technology are, by way of example, German Pat. No. 2,402,204, German Pat. No. 2,302,247, German Pat. No. 977,816, U.S. Pat. No. 3,793,481, German Pat. No. 2,734,913, U.S. Pat. No. 3,854,821, German Pat. No. 2,408,407 and Swiss Pat. No. 578,722.

In the aforementioned German Pat. No. 2,408,407 there is disclosed a state-of-the-art firing miss-measuring installation of the type under discussion, which is designated as a hit scoring system for firing weapons. This firing miss-measuring installation contains a measuring apparatus connected with the weapon, in order to measure the angular position at the moment of firing the weapon. An electronic device, produces from the angular positions, digital values. A T.V.-camera is movably arranged in the angular directions, in order to be able to track the target by means of the pick-up tubes. Means serve for measuring the direction of the visual or sighting target line to the target, and there are also provided means for measuring the position of the target image at the T.V-image or monitor screen. There is further provided a distance measuring apparatus in order to determine the distance between the target and the weapon. A process computer, computates from the digital data during measurement of the angular position of the weapon and the angular position of the T.V.-camera and the position of the target upon the television screen as well as from the distance measurement, quantatively the deviation between the correct target line and the actual target line of the weapon, and the process computer is activated at the moment that the weapon is fired.

With this heretofore known equipment the firing miss is determined according to the following procedures. There are measured the following data and the same stored in a process computer:

(1) The setting of the television camera;
(2) The distance between the target and the weapon;
(3) The angular position of the target line of the weapon; and
(4) The angular position of the visual target line of a target which has been recorded at the image surface of the television camera.

Then, at the moment of firing the weapon the process computer is turned-on so that the latter determines the exact target line of the weapon through which the projectile reaches the target. The actual target line of the weapon is then compared with the correct target line and there are determined the deviations between the correct target line and the measured target line of the weapon, in order to obtain a quantative indication of the accuracy during firing.

This heretofore known method is inaccurate, by virtue of the fact that the firing exercise is carried out with dummy ammunition instead of live ammunition, so that it is not possible to measure the distance of the projectile from the target. Rather, there only can be measured the angular deviations of the weapon from the probable correct angular settings, while taking into account the ballistics of the projectile.

SUMMARY OF THE INVENTION

Therefore, with the foregoing in mind it is a primary object of the present invention to provide a new and improved method and apparatus for measuring firing misses which is not associated with the aforementioned drawbacks and limitations of the prior art proposals.

Another and more specific object of the present invention aims at providing a new and improved method of, and apparatus for, measuring firing misses during towed-target firing, wherein a tow or drag target is drawn behind an aircraft and live ammunition is fired at the tow target.

Another important object of the present invention aims at the provision of a new and improved firing miss-measuring installation, by means of which there can be directly measured the firing misses, i.e. the spatial spacing between the projectile and the target.

Now in order to implement these and still further objects of the invention, which will become more readily apparent as the description proceeds, the method aspects of the present development are manifested by the features that, there is measured the distance of the projectile, fired at a target, and the target with the aid of two television cameras which are arranged in spaced relationship from one another, there is stored the distance between the projectile and the target, appearing at the television or image screens in a process computer, and with the aid of the process computer there is calculated and displayed, from the thus stored data, the actual firing misses.

As already alluded to above, the invention is not only concerned with the aforementioned method aspects, but further pertains to a new and improved construction of firing miss-measuring installation which is manifested by the features that it comprises:

(1) a second television camera arranged at an exact measured distance from the first television camera;
(2) a respective target tracking device for aligning both of the television cameras at the target;
(3) an analogue-digital converter in order to process into digital form the distance between the target and the projectile, appearing at the television screens of both television cameras; and
(4) a process computer which is programmed such as to calculate from the two-dimensional spacing between the target and the projectile, appearing at both television screens, the spatial distance between the target and the projectile.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
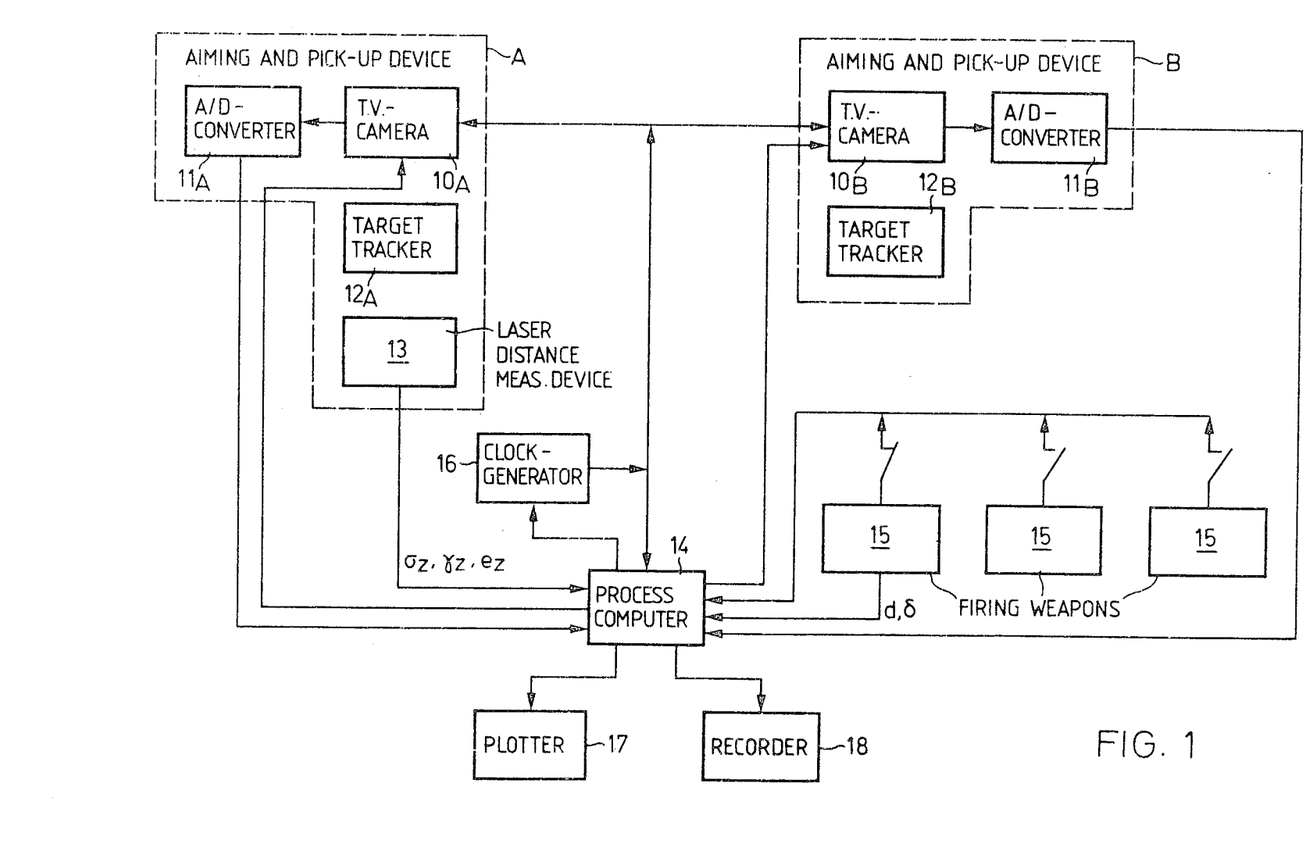
FIG. 1 is a block circuit diagram of the entire firing miss-measuring installation constructed according to the invention.

Describing now the drawings, according to the arrangement of FIG. 1 it will be seen that the firing miss-measuring installation comprises two ranging or aiming and pick-up devices A and B. Both of these aiming and pick-up devices A and B each contain a respective television camera $10_A$ and $10_B$ (also referred to as T.V-cameras), an analogue-digital converter $11_A$ and $11_B$ and an infrared target tracking device $12_A$ and $12_B$, respectively. There is additionally provided at the aiming and pick-up device A a laser distance measuring device 13.

The optical axis of the television cameras $10_A$ and $10_B$ are always essentially parallel to the optical axis of the infrared target tracking devices $12_A$ and $12_B$, respectively. The target which is to be tracked, for instance a tow target, a tow disc or a so-called drone, possesses an infrared source operating in the frequency range of the target tracking devices $12_A$ and $12_B$ in order to facilitate and ensure for correct target tracking. The television cameras $10_A$ and $10_B$ are equipped with special zoom lenses or objectives, which can be adjusted by means of the laser distance measuring device 13 and a computer 14 such that the image planes $E_A$ and $E_B$ (FIG. 5), in which is located the target, is always the same size, independent of the distance between the target and the camera. The dimensions of these surfaces amounts to 50 by 50 meters.

With the aid of the target tracking devices $12_A$ and $12_B$ the television cameras $10_A$ and $10_B$, respectively, are aligned such that the target always is located at the center of the image. The distance between the projectile G and the target Z can be numerically infed to the process computer 14 with the aid of the related analogue-digital converter $11_A$ and $11_B$, respectively, in a manner as will be described more fully hereinafter.

One or a number of firing weapons 15 are connected with the computer 14, in order, on the one hand, to switch-on the computer 14 at the moment of firing and, on the other hand, to indicate to the computer 14 their site in relation to the site of both aiming and pick-up devices A and B. With the aid of a clock generator 16 there is controlled the start of each image or picture of both of the television cameras $10_A$ and $10_B$. The results of the firing miss-measurements are recorded, on the one hand, by means of a plotter 17 (see also FIG. 6) and, on the other hand, printed-out by means of a suitable recording or writing device 18. The direction or laying of both of the television cameras $10_A$ and $10_B$, i.e. the elevation angle $\gamma_z$ and the azimuth angle $\sigma_z$ are infed to the process computer 14. The laser distance measuring device 13 indicates to the computer 14 the distance $e_z$ of the target Z from the aiming and recording or pick-up device A.

There is infed the following data to the process computer 14:

Azimuth angle $\sigma_z$ of the target Z for the television camera $10_A$;

Elevation angle $\gamma_z$ of the target Z for the television camera $10_A$;

Distance $e_z$ of the target Z for the television camera $10_A$; and

Site of the active weapon d, δ

Figure 2:
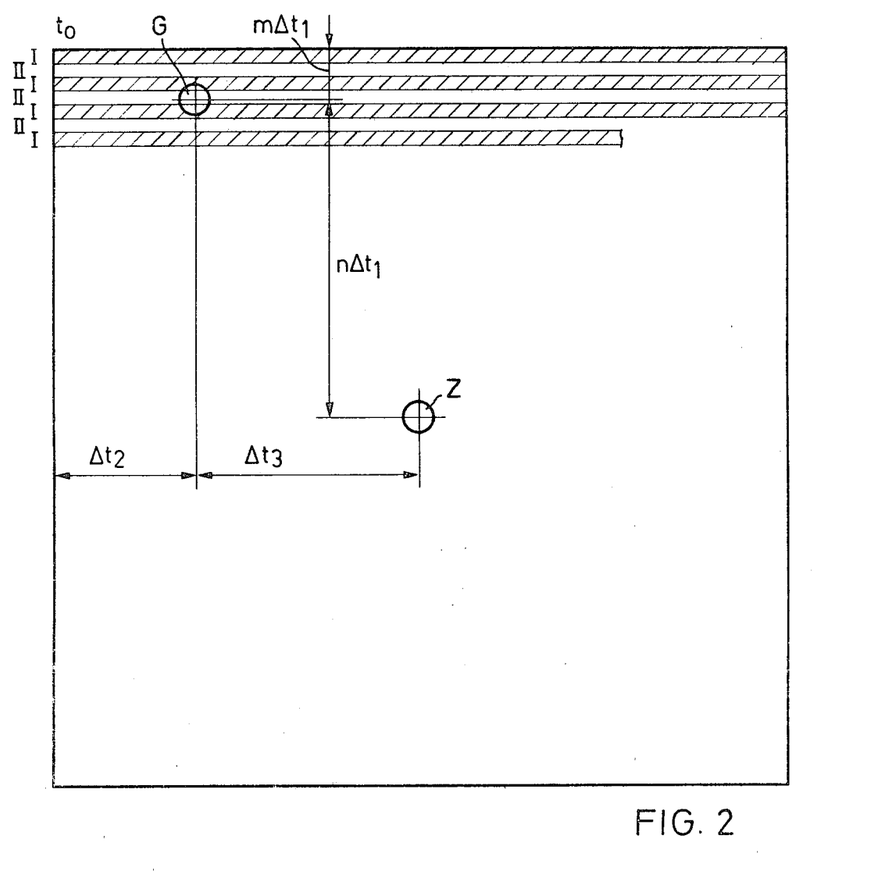
FIG. 2 illustrates part of the screen upon which there have been imaged the target and projectile.
Figure 5:
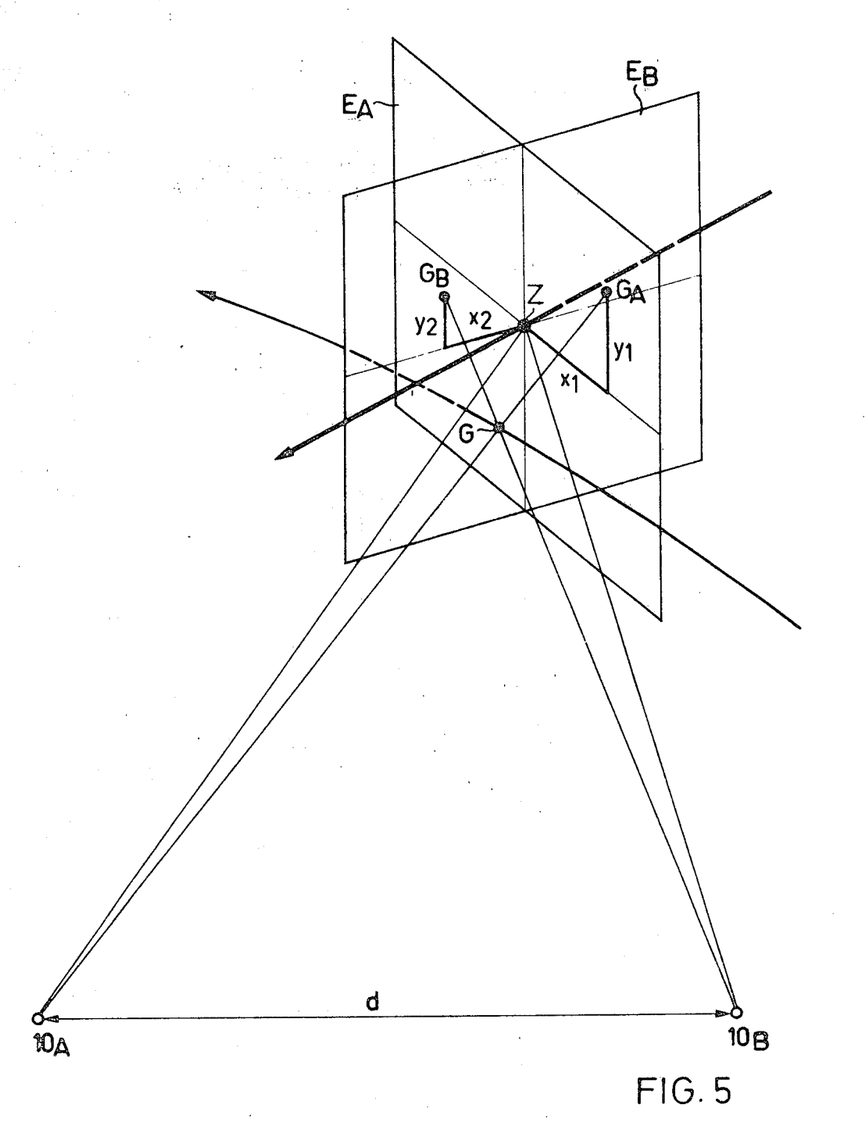
FIG. 5 is a perspective schematic illustration of the arrangement of the aligning and recording or pick-up devices and the image planes upon which there are apparent the distances between projectile and target.

According to the showing of FIGS. 2 and 5 there is, however, infed with the aid of the television cameras $10_A$ and $10_B$ to the process computer 14, also the distances $x_1$, $x_2$, $y_1$, $y_2$ of the projectile G from the target Z. Each of both television cameras $10_A$ and $10_B$ produces 50 half images per second. Each half image consists of 937.5 half lines. The lines of the first half image are indicated in FIG. 2 by reference character I and the lines of the second half image by reference character II. Since, as explained above, the image plane has a dimension of 50 by 50 meters, there results a line height of 27 millimeters, namely 50 meters divided by 1875 lines. Therefore, there are positively rendered visible at each half image projectiles of 35 millimeters diameter. As previously indicated reference character G designates the projectile and reference character Z the target, and the target Z is located at the center of the image.

The distance between the projectile G and the target Z can be computated from the position of the projectile G and the target Z upon the television or image screen. The light beam generating the lines of the image is located at the time $t_o$ at the upper left-hand corner of the image, at the time $t_1$ this light beam reaches the location where there has been imaged the projectile G, and at the time $t_2$ it has reached the position where there has been imaged the target Z. The value $\Delta t_1$ constitutes the time during which the light beam has plotted a line. The reference character n designates the number of lines between the projectile G and the target Z. The value $\Delta t_2$ constitutes the time, which the beam needs, in order to arrive from the left corner of the image at the projectile G and $\Delta t_3$ constitutes the time which is needed by the beam in order to move through the horizontal distance between the projectile G and the target Z. Reference character m constitutes the number of lines between the upper image edge and the projectile G.

$$t_1 = m\Delta t_1 + \Delta t_2$$

$$t_2 = t_1 + n\Delta t_1 + \Delta t_3$$

Figure 3A:
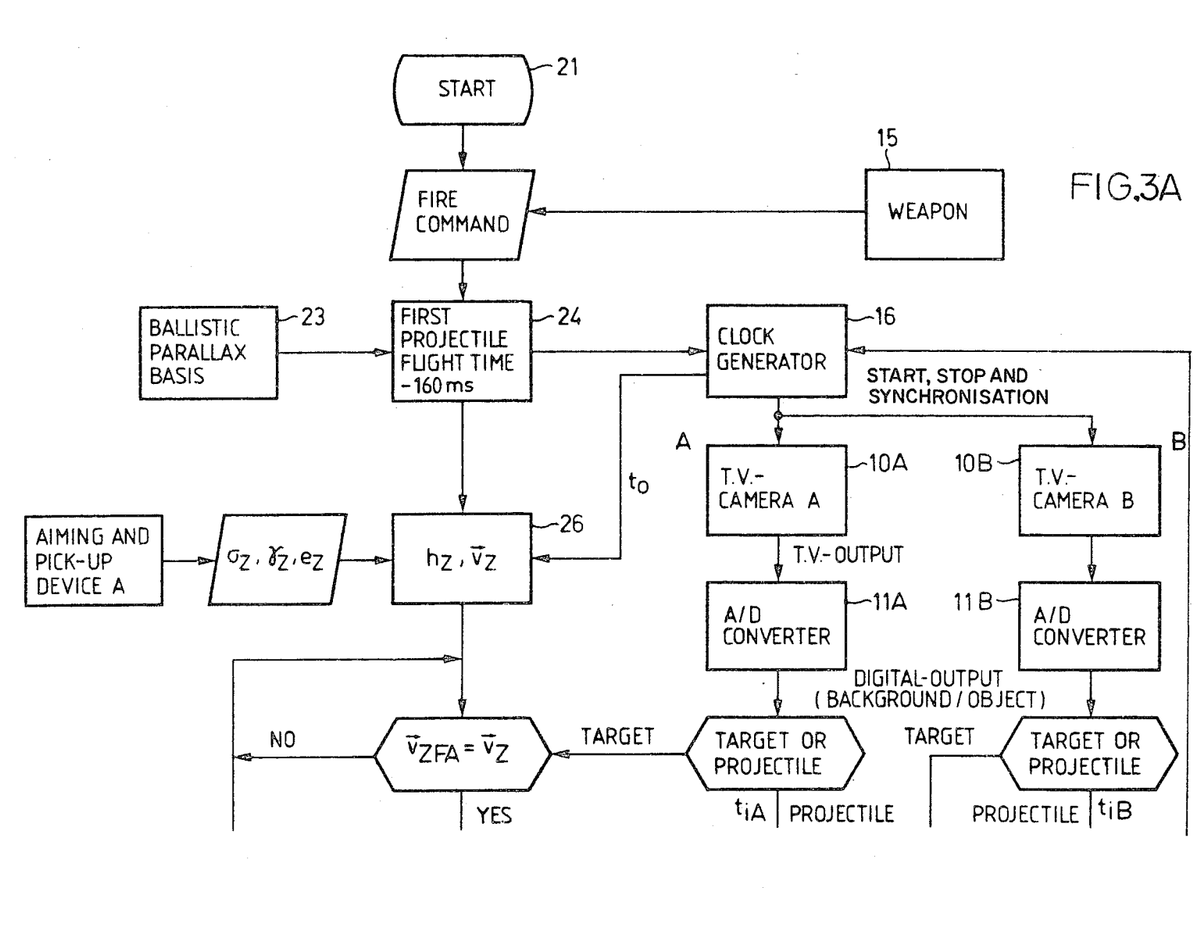
FIGS. 3A and 3B constitute a flow diagram of the firing miss-measurement operation.
Figure 3B:
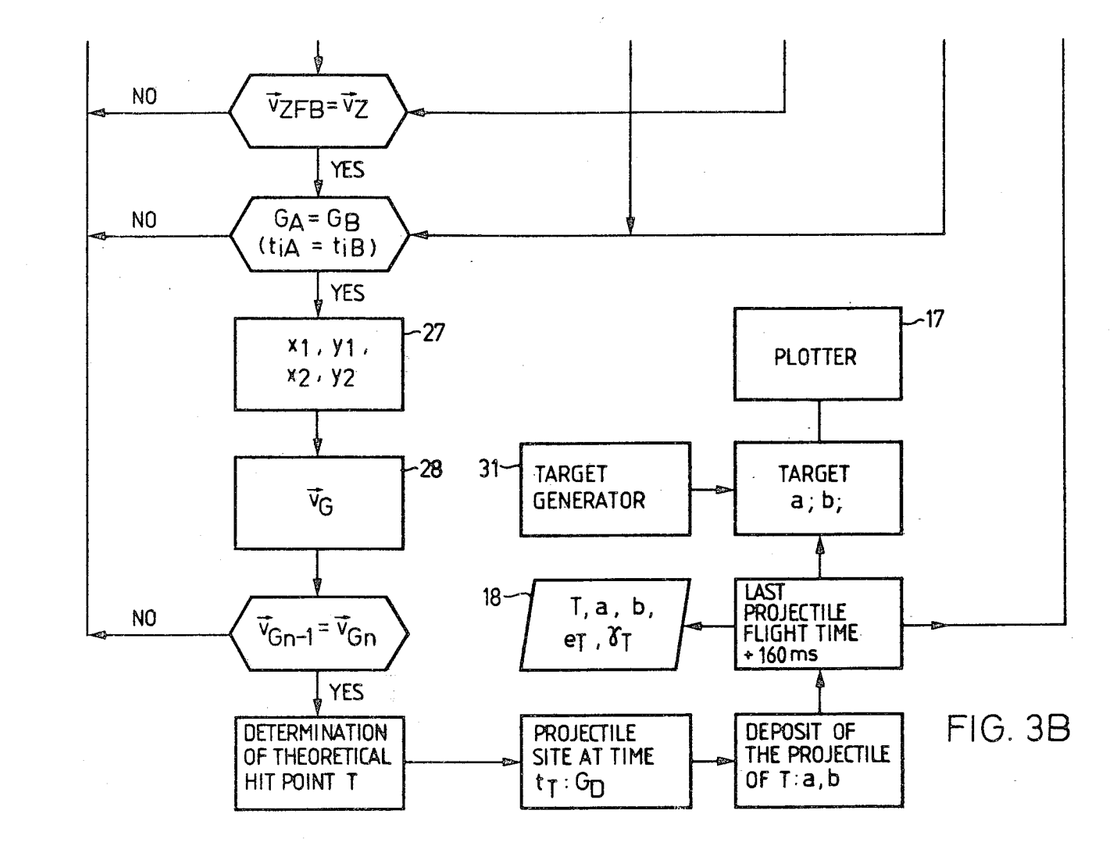

The construction of the computer 14 will be evident from the flow diagram of FIG. 3 which, in reality has been broken up into FIGS. 3A and 3B. By means of the start switch 21 the computer 14 is turned-on and it begins to carry out its mathematical operations as soon as there arrives from the weapon 15 the firing command. Additionally, by means of the storage or memory 23 of the computer 14 there is reported the site of the weapon which is in action, and equally, the ballistics of the projectile G. By means of the operator device 24 there is turned-on the clock generator 16, for instance 160 milliseconds before the first projectile arrives at the region of the target. By means of the aiming and recording or pick-up device A there can be reported the position of the target, that is to say, target azimuth angle $\sigma_z$, target elevation angle $\gamma_z$ and target distance $e_z$. Moreover, by means of the operation device 26 there is determined the elevation $h_z$ and the velocity vector $\vec{v}_z$ of the target Z at the time $t_o$ determined by the clock generator 16. During this time $t_o$ the clock generator 16 controls the television cameras 10$_A$ and 10$_B$ of the aiming and pick-up devices A and B, respectively. Both of the television cameras 10$_A$ and 10$_B$, report by means of the analogue-digital converters 11$_A$ and 11$_B$, respectively, the position of the objects which have been detected at the television screens. Objects at the center of the television screen are identified as targets Z and objects externally of the center of the screen as projectiles G. For control purposes the target velocity $\vec{v}_z$, determined by means of the aiming and pick-up device or apparatus A, is compared with the target velocity vectors $\vec{v}_{ZFA}$ and $\vec{v}_{ZFB}$ which have been determined by the television cameras 10$_A$ and 10$_B$, respectively. Additionally, the time $t_{iA}$, at which a projectile G appears at the one television camera A, is compared with the time $t_{iB}$ at which there appears a projectile at the upper television camera, in order to check whether both television cameras 10$_A$ and 10$_B$ are so-to-speak observing the same projectile. When $t_{iA} = t_{iB}$, then the horizontal and vertical distances $x_1$, $y_1$ of the projectile G from the target Z of the first television camera 10$_A$ and the horizontal and vertical distances $x_2$, $y_2$ of the projectile G from the target Z of the second camera 10$_B$ are determined in the operation means 27 from the time differences. There is calculated therefrom during the computation operation 28 the projectile velocity vector $\vec{v}_G$.

Figure 4:
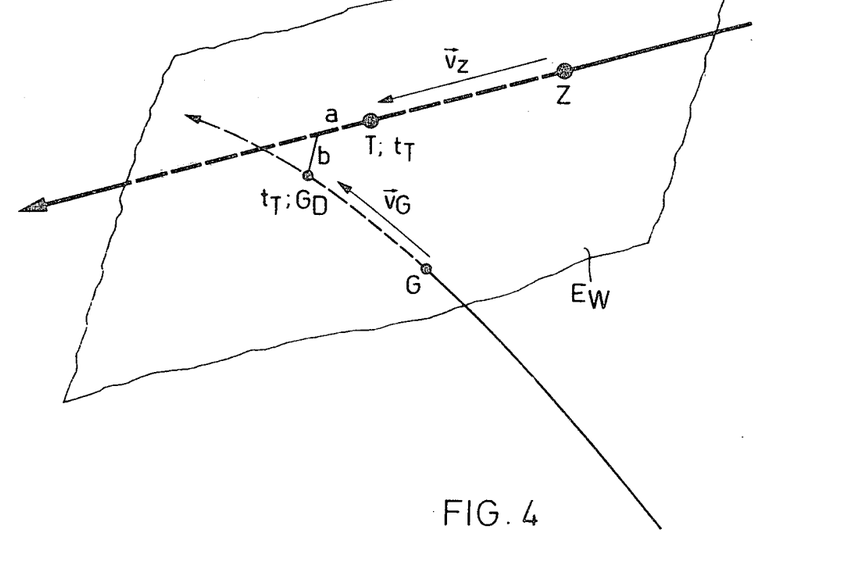
FIG. 4 is a perspective schematic illustration of the projectile trajectory and the target path.

According to the showing of FIG. 4, there is computated from the position of the target Z, upon firing of the projectile G, from the target path, from the target velocity vector $\vec{v}_z$ and from the projectile velocity vector $\vec{v}_g$ the theoretical hit point T, i.e. the point T at which the weapon should have been layed at the time $t_o$ of firing. Furthermore, there is computed from the projectile trajectory or flight path, determined by the television cameras 10$_A$ and 10$_B$, the site $G_D$ of the projectile G where it is located at the time $t_t$ i.e. the point in time when the target Z is located at the location T. Thereafter, there are determined the distances a, b, of the projectile $G_D$ from the target T at the time $t_t$. Finally, according to FIG. 6, there is printed-out by means of the sheet printer 18 the essential data and by means of the plotter 17 there is portrayed the position of the projectile G in relation to an artificial target $Z_R$ which is produced by the target generator 31.

Continuing, by referring to FIG. 5 it will be seen that both of the television cameras 10$_A$ and 10$_B$ are spaced from one another at a distance d. Each television camera 10$_A$ and 10$_B$ images a plane $E_A$ and $E_B$, respectively, in which there is located the target Z and dispositioned perpendicular to the connection line between the related television camera 10$_A$ and 10$_B$ and the target Z, as the case may be. This plane, by virtue of the special zoom lens or objective of both television cameras—as already explained—is always of the same size, i.e. it is, typically for instance by way of example and not limitation, 50 by 50 meters. The projectile G, which is located by the television cameras 10$_A$ and 10$_B$ in front of the planes $E_A$ and $E_B$, respectively, as shown in FIG. 5, is projected at right angles onto these planes $E_A$ and $E_B$. These projections have been designated by the corresponding reference characters $G_A$ and $G_B$. With the aid of the television cameras 10$_A$ and 10$_B$ it is possible to measure the distance of the projectile projections $G_A$ and $G_B$ to the target. This measurement has already been described in detail based upon the illustration of FIG. 2. The distances are divided into a horizontal distance $x_1$ and $x_2$ and into a vertical distance $y_1$ and $y_2$. Furthermore, in FIG. 5 there have been plotted the projectile flight path or trajectory and the target path and also the locations where the projectile trajectory passes through both of the planes $E_A$ and $E_B$.

In order to be able to positively discriminate between the projectile G and the target Z by means of the television cameras 10$_A$ and 10$_B$, as already explained, the relevant camera must be turned-on 160 milliseconds prior to the time $t_t$ i.e. the point in time when the first projectile G theoretically should hit the target Z and must be turned-off 160 milliseconds after the point in time when the last projectile G theoretically should have hit the target Z. In this way there is ensured that a number of images or pictures $G_A$ and $G_B$ are formed from each projectile G, whereas the target always is located at the image center, by virtue of the accuracy of the target tracking devices 12$_A$ and 12$_B$.

Now in FIG. 4 there is shown a plane $E_w$, where there is located the target Z at the aforementioned point in time $t_T$. This plane $E_w$ is disposed perpendicular to the connection line between the firing weapon 15 and the target T. Since the firing weapon 15 is arranged in spaced relationship from both of the television cameras 10$_A$ and 10$_B$, the plane $E_w$ never coincides with the previously mentioned image planes $E_A$ and $E_B$. Since what is of interest to the gunner are the firing misses i.e. the distance between the projectile G and the target Z and not the site of both television cameras 10$_A$ and 10$_B$, the firing misses must be computated by the process computer 14 i.e. there must be calculated the distances between the projectile G from the target Z in the plane $E_w$. This computation of the coordinates $x_1$, $y_1$, $x_2$, $y_2$ from the planes $E_A$ and $E_B$ into the coordinates in the plane $E_w$ constitutes a simple coordinate transformation which can be easily carried out in conventional manner by the process computer 14.

Figure 6:
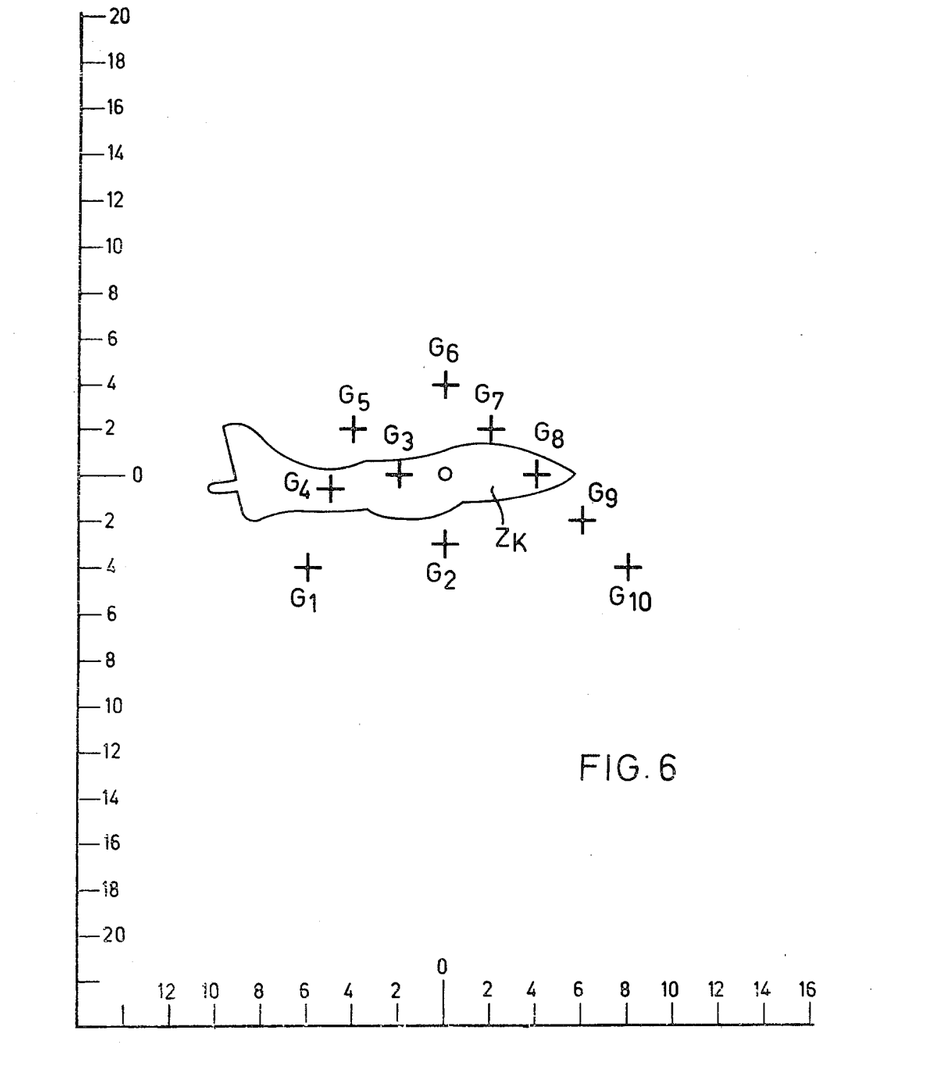
FIG. 6 is an illustration of a measurement result.

According to the showing of FIG. 6 there is imaged at the image screen of the plotter or recording device 17 the previously mentioned plane $E_w$. Upon this image screen there is produced by means of the target generator 31 an artificial image of the target Z, and based upon the aforementioned computation of the distance between the projectile G and the target Z the projectiles $G_1$ to $G_{10}$ are displayed at the plotter screen. Additionally, by means of the sheet recorder there are printed-out the horizontal and vertical distances.

While there are shown and described present preferred embodiments of the invention, it is to be distinctly understood that the invention is not limited thereto, but may be otherwise variously embodied and practiced within the scope of the following claims.

What I claim is:

1. A firing miss-measuring installation for measuring firing misses during firing at a movable airborne target, comprising:

a first television camera having a television screen and serving for tracking the movable airborne target;

a weapon for firing a projectile at the target, with a target line prevailing between said weapon and said target;

said target line having an azimuth angle and an elevation angle;

azimuth and elevation coding devices for measuring said azimuth angle and said elevation angle of said target line;

a distance measuring device for determining the distance between the target and a weapon;

a process computer operatively connected with the coding devices and the distance measuring device, in order to computate said azimuth angle, said elevation angle and said distance between the weapon and the target;

a second television camera having a screen and arranged at an exactly measured distance from the first television camera;

a respective target tracking device for aiming both of the television cameras at the target;

analogue-digital converter means for converting to digital form the distance between the target and the projectile appearing at the television screens of both television cameras; and process computer means for computating the distance between the target and the projectile from a two-dimensional distance appearing at both television screens.

* * * * *